(12) United States Patent
Horikoshi et al.

(10) Patent No.: US 7,309,733 B2
(45) Date of Patent: Dec. 18, 2007

(54) ORGANOPOLYSILOXANE COMPOSITION AND ELECTRONIC PART ENCAPSULATED THEREWITH

(75) Inventors: Jun Horikoshi, Gunma-ken (JP); Tsuneo Kimura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 207 days.

(21) Appl. No.: 10/941,884

(22) Filed: Sep. 16, 2004

(65) Prior Publication Data

US 2005/0059772 A1    Mar. 17, 2005

(30) Foreign Application Priority Data

Sep. 17, 2003  (JP)  ............................. 2003-324171
Apr. 28, 2004  (JP)  ............................. 2004-132441

(51) Int. Cl.
*C08L 83/06*  (2006.01)

(52) U.S. Cl. ...................... 524/588; 524/403; 524/413

(58) Field of Classification Search ................ 524/588, 524/403, 413
See application file for complete search history.

(56) References Cited

U.S. PATENT DOCUMENTS 6,040,362 A * 3/2000 Mine et al. ................. 523/212
2003/0105206 A1   6/2003 Hara et al.

FOREIGN PATENT DOCUMENTS

JP    2003-96301 A    4/2003

* cited by examiner

*Primary Examiner*—Kuo-Liang Peng
(74) *Attorney, Agent, or Firm*—Birch, Stewart, Kolasch & Birch, LLP

(57) ABSTRACT

An organopolysiloxane composition which contains from 0.01% to less than 0.5% by weight of a sulfidable metal powder is provided. When a silver-containing precision electronic part is encapsulated or sealed with the cured composition, the metal powder in the cured composition is sulfided with sulfur-containing gas, thereby preventing or retarding the corrosion of the encapsulated or sealed electronic part with the sulfur-containing gas.

8 Claims, No Drawings

ORGANOPOLYSILOXANE COMPOSITION AND ELECTRONIC PART ENCAPSULATED
THEREWITH

CROSS-REFERENCE TO RELATED APPLICATION

This non-provisional application claims priority under 35 U.S.C. §119(a) on Patent Application Nos. 2003-324171 and 2004-132441 filed in Japan on Sep. 17, 2003 and Apr. 28, 2004, respectively, the entire contents of which are hereby incorporated by reference.

TECHNICAL FIELD

This invention relates to an organopolysiloxane composition for use in the encapsulation and sealing of precision electronic parts. More particularly, it relates to an organopolysiloxane composition for use in the encapsulation and sealing of a silver-containing precision electronic part such as a silver electrode or silver chip resistor for preventing or retarding the corrosion of the electronic part with sulfur-containing gas, a method for preventing or retarding the corrosion of a silver-containing precision electronic part using the composition, and a silver-containing precision electronic part encapsulated with the composition.

BACKGROUND ART

Silicone rubber compositions are traditionally used in the encapsulation and sealing of electric and electronic parts for the purpose of preventing or retarding corrosion and degradation thereof. When electric and electronic parts are exposed to sulfur-containing gases such as sulfur gas and sulfur dioxide gas, conventional silicone rubbers fail to prevent or retard the sulfur-containing gas from reaching the electric and electronic parts. In particular, they are not effective for preventing or retarding corrosion of metal parts.

As modern devices comprising precision electronic parts are being reduced in size and power, challenges are made to a transition from copper to silver for the material of electrodes and chip resistors, and a narrowing of the gap between electrodes. Thus electronic parts become more susceptible to corrosion with sulfur-containing gas. JP-A 2003-096301 (US 2003/0105206 A1) discloses a silicone rubber composition for use in the encapsulation and sealing of electric or electronic parts which is obtained by adding 0.5 to 90% by weight of a metal powder which is sulfidable with sulfur-containing gas to an organopolysiloxane compound. The composition is effective for preventing or retarding the sulfur-containing gas from reaching the electric or electronic parts. The organopolysiloxane composition with such high loadings of metal powder, however, has the tendency that metal particles agglomerate locally, with the probable risks of short-circuiting between electrodes and reducing insulation resistance. When the composition is stored for a long term, the metal powder can settle down due to a higher specific gravity than the organopolysiloxane.

SUMMARY OF THE INVENTION

An object of the invention is to provide an organopolysiloxane composition for the sealing and encapsulation of electric and electronic parts, which composition can prevent or retard the electric and electronic parts from corrosion with sulfur-containing gas, thus eliminating the risks of short-circuiting between electrodes and reducing insulation resistance; a method of preventing or retarding corrosion of precision electronic parts using the composition; and a silver-containing precision electronic part encapsulated with the composition.

It has been found that when a precision electronic part, typically a silver electrode or silver chip resistor is encapsulated or sealed with an organopolysiloxane composition in the cured state to which 0.01% to less than 0.5% by weight of a sulfidable metal powder, typically copper powder is added, the metal powder in the cured composition is sulfided with sulfur-containing gas for thereby preventing or retarding the corrosion of the precision electronic part with the sulfur-containing gas. The precision electronic part encapsulated or sealed with the composition thus eliminates the risks of electrode short-circuiting and insulation resistance lowering.

In a first aspect, the present invention provides an organopolysiloxane composition for use in the encapsulation and sealing of precision electronic parts, comprising 0.01% to less than 0.5% by weight of a metal powder which is sulfidable with sulfur-containing gas, wherein when a precision electronic part is encapsulated or sealed with the cured composition, the metal powder in the cured composition is sulfided with sulfur-containing gas for thereby preventing or retarding the corrosion of the precision electronic part with the sulfur-containing gas.

In a second aspect, the present invention provides a method for preventing or retarding the corrosion of a silver-containing precision electronic part with sulfur-containing gas when the electronic part is used in the presence of sulfur-containing gas, the method comprising encapsulating or sealing the electronic part with the organopolysiloxane composition in the cured state, whereby the metal powder in the cured composition is sulfided with the sulfur-containing gas for thereby preventing or retarding the corrosion of the electronic part with the sulfur-containing gas.

In a third aspect, the present invention provides a silver-containing precision electronic part encapsulated with the organopolysiloxane composition in the cured state, which part is a silver electrode or a silver chip resistor.

When the organopolysiloxane composition of the invention is used for the encapsulation and sealing of silver-containing precision electronic parts, typically silver electrodes and silver chip resistors, the composition effectively functions to prevent or retard the precision electronic parts from corrosion with sulfur-containing gas. The precision electronic parts are thus free of electrode short-circuiting and insulation resistance lowering.

DESCRIPTION OF THE PREFERRED EMBODIMENTS

The organopolysiloxane composition of the present invention contains 0.01% to less than 0.5% by weight of a metal powder, cures into an insulating silicone rubber, and is used for the encapsulation and sealing of precision electronic parts. When precision electronic parts are encapsulated or sealed with the cured composition, the metal powder in the cured composition is sulfided with sulfur-containing gas for thereby preventing or retarding the corrosion of the precision electronic parts with the sulfur-containing gas. The precision electronic parts are preferably silver-containing parts, and especially silver electrodes or silver chip resistors.

The metal powder used herein is sulfidable with sulfur-containing gas into a metal sulfide powder which can prevent or retard the precision electronic part from corrosion with sulfur-containing gas. Examples of such sulfidable metals include silver, copper, iron, nickel, aluminum, tin and zinc, and alloys comprising at least one of the foregoing metals. Of these, copper powder is preferred for stability in the composition and economy.

It is not critical how to prepare the metal powder. For eliminating any detrimental effect to precision electronic parts, especially electrode short-circuiting and insulation resistance lowering, the metal powder should preferably have an average particle size of up to 10 μm, more preferably up to 5 μm. The lower limit of average particle size is preferably at least 0.01 μm, more preferably at least 0.1 μm. The average particle size is determined as a weight average value or median diameter in particle size distribution measurement by the laser light diffraction method.

The metal powder is added in an amount necessary to prevent or retard precision electronic parts from corrosion with sulfur-containing gas. Large amounts of the metal powder added can be detrimental to precision electronic parts. Therefore, the metal powder should be added in an amount of from 0.01% to less than 0.5% by weight, preferably from 0.05% to less than 0.5% by weight, more preferably from 0.1% to 0.4% by weight, based on the total weight of the organopolysiloxane composition.

The organopolysiloxane composition of the invention contains an organopolysiloxane as a base polymer and a specific amount of metal powder. The curing mode of the composition is not particularly limited. The composition may be of the condensation cure, addition cure, organic peroxide cure, radiation cure and other cure types which are known in the art. Of these, the condensation cure and addition cure types are preferred, with the condensation cure type capable of curing at room temperature and achieving a good adhesion being most preferred. Also preferably the composition is a liquid one.

The organopolysiloxane serving as a base polymer is preferably of the average compositional formula (1).

$$R^1_a SiO_{(4-a)/2} \tag{1}$$

Herein, $R^1$ is the same or different and selected from substituted or unsubstituted monovalent hydrocarbon groups of 1 to 12 carbon atoms, especially 1 to 10 carbon atoms. Illustrative, non-limiting examples include alkyl groups such as methyl, ethyl, propyl, butyl, 2-ethylbutyl and octyl; cycloalkyl groups such as cyclohexyl and cycloheptyl; alkenyl groups such as vinyl, hexenyl and allyl; aryl groups such as phenyl, tolyl, xylyl, naphthyl and diphenyl; aralkyl groups such as benzyl and phenylethyl; and substituted forms of the foregoing groups in which some or all of the hydrogen atoms attached to carbon atoms are substituted with halogen atoms, cyano groups or the like, such as chloromethyl, trifluoropropyl, 2-cyanoethyl and 3-cyanopropyl. Of these, methyl, vinyl, phenyl and trifluoropropyl are preferred. The subscript "a" is from 1.90 to 2.05, preferably from 1.95 to 2.04.

In a first embodiment wherein the organopolysiloxane composition is of the condensation cure type, the base polymer is typically a diorganopolysiloxane blocked with hydroxyl groups or organoxy groups such as $C_1$-$C_4$ alkoxy groups at both ends of the molecular chain. In order that the composition form a cured product having satisfactory rubber physical properties and mechanical strength, the base polymer should preferably have a viscosity at 25° C. of at least 25 mPa·s, more preferably about 100 to about 1,000,000 mPa·s, most preferably about 200 to about 500,000 mPa·s.

In the organopolysiloxane composition of condensation cure type, a crosslinking agent is used which is preferably a silane or siloxane compound having at least two hydrolyzable groups in a molecule. Exemplary of suitable hydrolyzable groups are alkoxy groups such as methoxy, ethoxy and butoxy, ketoxime groups such as dimethyl ketoxime and methyl ethyl ketoxime, acyloxy groups such as acetoxy, alkenyloxy groups such as isopropenyloxy and isobutenyloxy, amino groups such as N-butylamino and N,N-diethylamino, and amide groups such as N-methylacetamide. Of these, alkenyloxy and alkoxy groups are most preferred because no corrosive gases evolve upon curing. The crosslinking agent is preferably compounded in an amount of 2 to 50 parts, more preferably 5 to 20 parts by weight per 100 parts by weight of the both end hydroxyl or organoxy group-blocked organopolysiloxane.

In the organopolysiloxane composition of condensation cure type, a curing catalyst is often used. Suitable curing catalysts include alkyltin esters such as dibutyltin diacetate, dibutyltin dilaurate, and dibutyltin dioctoate; titanates and titanium chelates such as tetraisopropoxytitanium, tetra-n-butoxytitanium, tetrakis(2-ethylhexoxy)titanium, dipropoxybis(acetylacetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; aminoalkyl group-substituted alkoxysilanes such as 3-aminopropyltriethoxysilane and N-β-(aminoethyl)-γ-aminopropyltrimethoxysilane; amine compounds and salts thereof such as hexylamine and phosphoric acid dodecylamine; quaternary ammonium salts such as benzyl triethylammonium acetate; alkali metal salts of lower fatty acids such as potassium acetate, sodium acetate and lithium oxalate; dialkylhydroxylamines such as dimethylhydroxylamine and diethylhydroxylamine; and silane and siloxane compounds having a guanidyl group such as tetramethylguanidylpropyltrimethoxysilane, tetramethylguanidylpropylmethyldimethoxysilane and tetramethylguanidylpropyltris(trimethylsiloxy)silane. They may be used alone or in admixture. The curing catalyst is preferably compounded in an amount of 0 to 10 parts, more preferably 0.01 to 5 parts by weight per 100 parts by weight of the organopolysiloxane.

In a second embodiment wherein the organopolysiloxane composition is of the addition cure type, the base polymer is an organopolysiloxane having at least two alkenyl groups, preferably vinyl groups, at the end and/or within the molecular chain, more preferably in an amount of 0.01 to 15 mol %, especially.0.02 to 5 mol % based on the entire substituent groups ($R^1$ in the average compositional formula (1)). This organopolysiloxane may be either liquid or gum, and preferably has a viscosity at 25° C. of about 100 to about 20,000,000 mPa·s, more preferably about 200 to 10,000,000 mPa·s.

Used as the crosslinking agent is an organohydrogenpolysiloxane having at least two, preferably at least three hydrogen atoms each attached to a silicon atom (SiH groups) in a molecule. This organohydrogenpolysiloxane may be selected from well-known ones, typically those having the average compositional formula (2) shown below, and preferably those having a viscosity at 25° C. of up to 500 mPa·s, especially 1 to 300 mPa·s.

$$H_b R^2_c SiO_{(4-b-c)/4} \tag{2}$$

Herein $R^2$ is independently a substituted or unsubstituted monovalent hydrocarbon group free of aliphatic unsaturation. The substituted or unsubstituted monovalent hydrocarbon groups free of aliphatic unsaturation are typically those having 1 to 10 carbon atoms, preferably 1 to 7 carbon atoms, as exemplified above for $R^1$ in formula (1). Preferred are lower alkyl groups of 1 to 3 carbon atoms such as methyl, phenyl and 3,3,3-trifluoropropyl. The subscripts b and c are numbers satisfying $0<b<2$, $0.8 \leq c \leq 2$, and $0.8<b+c \leq 3$, preferably $0.05 \leq b \leq 1$, $1.5 \leq c \leq 2$, and $1.8 \leq b+c \leq 2.7$.

Examples of the organohydrogenpolysiloxane include siloxane oligomers such as 1,1,3,3-tetramethyldisiloxane, 1,3,5,7-tetramethyltetracyclosiloxane, and 1,3,5,7,8-pentamethylpentacyclosiloxane; both end trimethylsiloxy-blocked methylhydrogenpolysiloxane, both end trimethylsiloxy-blocked dimethylsiloxane-methylhydrogensiloxane copolymers, both end silanol-blocked methylhydrogenpolysiloxane, both end silanol-blocked dimethylsiloxane-methylhydrogen-siloxane copolymers, both end dimethylhydrogensiloxy-blocked dimethylpolysiloxane, both end dimethylhydrogensiloxy-blocked methylhydrogen-polysiloxane, both end dimethylhydrogensiloxy-blocked dimethylsiloxane-methylhydrogensiloxane copolymers; and silicone resins comprising $R_2(H)SiO_{1/2}$ units and $SiO_{4/2}$ units and optionally, $R_3SiO_{1/2}$ units, $R_2SiO_{2/2}$ units, $R(H)SiO_{2/2}$ units, $(H)SiO_{3/2}$ units or $RSiO_{3/2}$ units wherein R is a substituted or unsubstituted monovalent hydrocarbon group as exemplified above for $R^2$.

The organohydrogenpolysiloxane is preferably used in such an amount as to give 0.3 to 10 moles, more preferably 0.5 to 5 moles of SiH groups per mole of alkenyl groups in the organopolysiloxane as the base polymer.

To the organopolysiloxane composition of addition cure type, a curing catalyst may be added in a catalytic amount. The curing catalyst may be selected from well-known addition reaction catalysts, preferably Group VIII metals and compounds thereof, especially platinum compounds. Typical platinum compounds include chloroplatinic acid and complexes of platinum with olefins or the like. The catalyst is preferably used in an amount of about 0.1 to 2,000 ppm, more preferably about 1 to 500 ppm of Group VIII metal based on the weight of organopolysiloxane as the base polymer.

In a third embodiment wherein the organopolysiloxane composition is a silicone rubber composition of the organic peroxide cure type, the base polymer is an organopolysiloxane which is preferably gum-like, that is, having a viscosity at 25° C. of about 100,000 to about 20,000,000 mPa·s, especially about 1,000,000 to about 10,000,000 mPa·s and containing at least two alkenyl groups (typically vinyl groups) at the end of and/or within the molecular chain, more preferably in an amount of 0.01 to 15 mol %, especially 0.02 to 5 mol % based on the entire substituent groups ($R^1$ in the average compositional formula (1)).

Organic peroxides are used as the curing catalyst. Suitable organic peroxides include alkyl peroxides such as dicumyl peroxide and di-t-butyl peroxide, and acyl peroxides such as benzoyl peroxide and 2,4-dichlorobenzoyl peroxide. The organic peroxide is preferably used in an amount of 0.1 to 10 parts, more preferably 0.2 to 5 parts by weight per 100 parts by weight of the organopolysiloxane as the base polymer.

In a fourth embodiment wherein the organopolysiloxane composition is a silicone rubber composition of the radiation cure type, the base polymer is an organopolysiloxane containing at least two of aliphatic unsaturated groups (e.g., vinyl, allyl, alkenyloxy, acrylic and methacrylic), mercapto, epoxy and hydrosilyl groups at the end of and/or within the molecular chain, more preferably in an amount of 0.01 to 15 mol %, especially 0.02 to 5 mol % based on the entire substituent groups ($R^1$ in the average compositional formula (1)). It preferably has a viscosity at 25° C. of about 100 to about 1,000,000 mPa·s, especially about 200 to about 100,000 mPa·s.

A reaction initiator is used in this embodiment. Suitable initiators, as are well known in the art, include acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthol, 3,9-dichloroxanthol, 3-chloro-8-nonylxanthol, benzoin, benzoin methyl ether, benzoin butyl ether, bis(4-dimethylaminophenyl) ketone, benzylmethoxyketal, and 2-chlorothioxanthol. The initiator is preferably used in an amount of 0.1 to 20 parts, more preferably 0.5 to 10 parts by weight per 100 parts by weight of the organopolysiloxane as the base polymer.

In the organopolysiloxane composition loaded with a specific amount of metal powder according to the invention, there are preferably compounded adhesive aids which are also known as silane coupling agents, for example, aminosilanes such as γ-aminopropyltriethoxysilane and [3-(2-aminoethyl)aminopropyl]trimethoxysilane, epoxysilanes such as γ-glycidoxypropyltrimethoxysilane and β-(3,4-epoxycyclohexyl)ethyltrimethoxysilane, and isocyanate silanes such as isocyanate propyltrimethoxysilane and isocyanate propyltriethoxysilane. An appropriate amount of the adhesive aid is 0.1 to 20 parts by weight, more preferably 0.2 to 10 parts by weight per 100 parts by weight of the organopolysiloxane as the base polymer.

If necessary, a filler may be compounded in the organopolysiloxane composition as long as it does not compromise the object of the invention. Such fillers include finely divided silica, silica aerogel, precipitated silica, diatomaceous earth, metal oxides such as iron oxide, zinc oxide, titanium oxide, and aluminum oxide, metal nitrides such as boron nitride and aluminum nitride, metal carbonates such as calcium carbonate, magnesium carbonate, and zinc carbonate, asbestos, glass wool, carbon black, mica fines, fused silica powder, and powder synthetic resins such as polystyrene, polyvinyl chloride, and polypropylene. These fillers may be compounded in any desired amount as long as this does not compromise the object of the invention. Preferably the fillers are dried to remove moisture prior to use. The fillers may or may not be surface treated with a suitable agent such as silane coupling agents, organopolysiloxane or fatty acids.

The inventive organopolysiloxane composition may include additives such as plasticizers, pigments, dyes, anti-aging agents, antioxidants, antistatic agents, and flame retardants (e.g., antimony oxide and chlorinated paraffin). Other useful additives include thixotropic improvers such as polyethers, mildew-proofing agents, and anti-fungal agents.

The inventive organopolysiloxane composition is prepared by intimately mixing the above-mentioned components and optionally, fillers and various additives in a dry atmosphere. With respect to the curing conditions for the inventive organopolysiloxane composition, any conventional curing process may be employed depending on a particular cure type.

Also, the organopolysiloxane composition in the cured state preferably contains not more than 500 ppm, more preferably not more than 300 ppm of low molecular weight siloxanes having a degree of polymerization of up to 10. This is because low molecular weight siloxanes can have a negative impact on precision electronic parts. The content of low molecular weight siloxanes can be reduced by well-known techniques, for example, by augmenting the stripping step during preparation of the organopolysiloxane as the base polymer, or by washing the organopolysiloxane with a solvent.

EXAMPLE

Examples of the invention are given below by way of illustration and not by way of limitation. All parts are by weight and the viscosity is a measurement (in mPa·s) at 25° C. The dimethylpolysiloxane used in Examples is one in which the content of low molecular weight siloxanes having a degree of polymerization of up to 10 is reduced to 500 ppm or lower by augmenting the stripping step during preparation of the organopolysiloxane.

Example 1

A composition was prepared by mixing, in an anhydrous state, 100 parts of dimethylpolysiloxane blocked with hydroxyl groups at both ends of the molecular chain and having a viscosity of 5,000 mPa·s with 60 parts of crystalline silica, 8 parts of phenyltri(isopropenyloxy)-silane, 1 part of 3-aminopropyltriethoxysilane, 1.4 parts of 1,1,3,3-tetramethyl-2-[3-(trimethoxysilyl)propyl]guanidine, and 0.3% by weight based on the entire composition of a copper powder 1100Y having an average particle size of 1.0 μm (trade name, Mitsui Mining and Smelting Co., Ltd.) as the metal powder, followed by defoaming/mixing treatment.

Example 2

A composition was prepared by mixing, in an anhydrous state, 100 parts of dimethylpolysiloxane blocked with hydroxyl groups at both ends of the molecular chain and having a viscosity of 5,000 mPa·s with 60 parts of crystalline silica, 8 parts of phenyltri(isopropenyloxy)-silane, 1 part of 3-aminopropyltriethoxysilane, 1.4 parts of 1,1,3,3-tetramethyl-2-[3-(trimethoxysilyl)propyl]guanidine, and 0.01% by weight based on the entire composition of copper powder 1100Y as the metal powder, followed by defoaming/mixing treatment.

Example 3

A composition was prepared by mixing, in an anhydrous state, 100 parts of dimethylpolysiloxane blocked with hydroxyl groups at both ends of the molecular chain and having a viscosity of 5,000 mPa·s with 60 parts of crystalline silica, 8 parts of phenyltri(isopropenyloxy)-silane, 1 part of 3-aminopropyltriethoxysilane, 1.4 parts of 1,1,3,3-tetramethyl-2-[3-(trimethoxysilyl)propyl]guanidine, and 0.4% by weight based on the entire composition of copper powder 1100Y as the metal powder, followed by defoaming/mixing treatment.

Example 4

A composition was prepared by mixing, in an anhydrous state, 100 parts of dimethylpolysiloxane blocked with trimethoxysilyl groups at both ends of the molecular chain and having a viscosity of 5,000 mPa·s with 60 parts of crystalline silica, 7 parts of methyltrimethoxysilane, 0.2 part of 3-aminopropyltriethoxysilane, 2 parts of titanium chelate catalyst Orgatix TC-750 (trade name, Matsumoto Trading Co., Ltd.), and 0.3% by weight based on the entire composition of copper powder 1100Y as the metal powder, followed by defoaming/mixing treatment.

Example 5

A composition was prepared by mixing, in an anhydrous state, 100 parts of dimethylpolysiloxane blocked with vinyl groups at both ends of the molecular chain and having a viscosity of 5,000 mPa·s with 60 parts of crystalline silica, 6 parts of methylhydrogenpolysiloxane having on average 16 SiH groups on molecular side chains and having a viscosity of 100 mPa·s, an amount of a vinylsiloxane complex of chloroplatinic acid to give 10 ppm of platinum relative to the total weight of the mixture, 0.15 part of a 50% toluene solution of ethynyl cyclohexanol, and 0.3% by weight based on the entire composition of copper powder 1100Y, followed by defoaming/mixing treatment.

Example 6

A composition was prepared by mixing, in an anhydrous state, 100 parts of dimethylpolysiloxane blocked with vinyl groups at both ends of the molecular chain and having a viscosity of 5,000 mPa·s with 60 parts of crystalline silica, 1 part of dicumyl peroxide, and 0.3% by weight based on the entire composition of copper powder 1100Y, followed by defoaming/mixing treatment.

Example 7

A composition was prepared by mixing, in an anhydrous state, 100 parts of dimethylpolysiloxane blocked with bis(acryloxymethyldimethylsiloxy)methylsilyl groups at both ends of the molecular chain and having a viscosity of 5,000 mPa·s with 60 parts of crystalline silica, 3.0 parts of diethoxyacetophenone, and 0.3% by weight based on the entire composition of copper powder 1100Y, followed by defoaming/mixing treatment.

Comparative Example 1

A composition was prepared by mixing, in an anhydrous state, 100 parts of dimethylpolysiloxane blocked with hydroxyl groups at both ends of the molecular chain and having a viscosity of 5,000 mPa·s with 60 parts of crystalline silica, 8 parts of phenyltri(isopropenyloxy)-silane, 1 part of 3-aminopropyltriethoxysilane, and 1.4 parts of 1,1,3,3-tetramethyl-2-[3-(trimethoxysilyl)propyl]-guanidine, followed by defoaming/mixing treatment.

Comparative Example 2

A composition was prepared by mixing, in an anhydrous state, 100 parts of dimethylpolysiloxane blocked with hydroxyl groups at both ends of the molecular chain and having a viscosity of 5,000 mPa·s with 60 parts of crystalline silica, 8 parts of phenyltri(isopropenyloxy)-silane, 1 part of 3-aminopropyltriethoxysilane, 1.4 parts of 1,1,3,3-tetramethyl-2-[3-(trimethoxysilyl)propyl]guanidine, and 1.0% by weight based on the entire composition of copper powder 1100Y as the metal powder, followed by defoaming/mixing treatment.

[Corrosion Test]

On a silver-plated copper strip, each of the compositions prepared in Examples 1 to 7 and Comparative Examples 1 to 2 was coated to a thickness of 2 mm and cured to form a test sample. The sample was placed in a 100-ml glass bottle together with 0.2 g of sulfur powder. The bottle was closed and heated at 80° C. for several days. At predetermined intervals, the cured composition was stripped from the sample to visually examine the degree of corrosion on the silver plating. The sample was rated "○" for no corrosion and "×" for corrosion observed as blackening. The results are shown in Table 1.

TABLE 1

Corrosion test

| | Example | | | | | | | Comparative Example | |
|---|---|---|---|---|---|---|---|---|---|
| | 1 | 2 | 3 | 4 | 5 | 6 | 7 | 1 | 2 |
| Initial | ○ | ○ | ○ | ○ | ○ | ○ | ○ | ○ | ○ |
| 6 hours | ○ | ○ | ○ | ○ | ○ | ○ | ○ | X | ○ |
| 1 day | ○ | ○ | ○ | ○ | ○ | ○ | ○ | X | ○ |
| 3 days | ○ | ○ | ○ | ○ | ○ | ○ | ○ | X | ○ |
| 7 days | ○ | ○ | ○ | ○ | ○ | ○ | ○ | X | ○ |

[Insulation Test]

On a comb-shaped silver electrode formed on a glass substrate by evaporating silver at an electrode width of 35 μm and an electrode-to-electrode gap of 55 μm, each of the compositions prepared in Examples 1 to 7 and Comparative Examples 1 to 2 was coated to a thickness of 2 mm and cured to form a test sample. With cords connected to opposite ends of the comb-shaped silver electrode on the test sample, the resistance value across the comb-shaped silver electrode was measured by means of an insulation resistance meter 3213A by Yokogawa M&C Corp. The sample was rated "○" for good insulation (1000 Mω or higher) or "×" for reduced insulation (lower than 1000 Mω).

TABLE 2

Insulation test

| Example | | | | | | | Comparative Example | |
|---|---|---|---|---|---|---|---|---|
| 1 | 2 | 3 | 4 | 5 | 6 | 7 | 1 | 2 |
| ○ | ○ | ○ | ○ | ○ | ○ | ○ | ○ | X |

For the cured compositions of Examples 1 to 4, the content of low molecular weight siloxanes having a degree of polymerization of up to 10 was measured by gas chromatography, finding contents of 250 to 260 ppm.

As seen from the test results, the metal powder-free organopolysiloxane composition (Comparative Example 1) failed to retard the corrosion of silver plating. The organopolysiloxane composition loaded with 1.0 wt % of metal powder (Comparative Example 2) allowed short-circuiting between electrodes or lowering of insulation resistance.

In contrast, the organopolysiloxane compositions loaded with 0.01 to less than 0.5 wt % of metal powder (Examples 1 to 7) provided the effect of preventing or retarding the corrosion of silver plating while eliminating electrode short-circuiting or insulation resistance lowering.

Japanese Patent Application Nos. 2003-324171 and 2004-132441 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organopolysiloxane composition for use in the encapsulation and sealing of precision electronic parts, comprising
   100 parts by weight of an organopolysiloxane represented by the average compositional formula $R^1_a SiO_{(4-a)/2}$ wherein $R^1$ is the same or different and is selected from substituted or unsubstituted monovalent hydrocarbon groups of 1 to 12 carbon atoms and "a" is from 1.90 to 2.05, the organopolysiloxane being blocked with hydroxyl groups or organoxy groups at both ends of the molecular chain and having a viscosity at 25° C. of at least 24 mPa·s,
   2 to 50 parts by weight of a crosslinking agent which is a silane or siloxane compound having at least two hydrolysable groups in a molecule,
   0.01 to 10 parts by weight of a curing catalyst selected from the group consisting of alkyltin esters, titanates, titanium chelates, organometallic compounds, aminoalkyl group-substituted ammonium salts, alkyl metal salts of lower fatty acids, dialkylhydroxylamines, and silane and siloxane compounds having a guanidyl group, and
   0.05 to 0.4% by weight of a metal powder having an average particle size of 0.01 to 10 μm which is sulfidable with sulfur-containing gas, wherein when a precision electronic part is encapsulated or sealed with the cured composition, the metal powder in the cured composition is sulfided with sulfur-containing gas for thereby preventing or retarding the corrosion of the precision electronic part with the sulfur-containing gas.

2. The organopolysiloxane composition of claim 1, wherein said metal powder is a copper powder.

3. The organopolysiloxane composition of claim 1, wherein said metal powder has an average particle size of 0.01 to 5 μm.

4. The organopolysiloxane composition of claim 1, which is of the condensation cure type.

5. The organopolysiloxane composition of claim 1, wherein the cured composition contains not more than 500 ppm of low molecular weight siloxanes having a degree of polymerization of up to 10.

6. The organopolysiloxane composition of claim 1, wherein said precision electronic part contains silver.

7. A method for preventing or retarding the corrosion of a silver-containing precision electronic part with sulfur-containing gas when the electronic part is used in the presence of sulfur-containing gas,
   said method comprising encapsulating or sealing the electronic part with an organopolysiloxane composition comprising
   100 parts by weight of an organopolysiloxane represented by the average compositional formula $R^1_a SiO_{(4-a)/2}$ wherein $R^1$ is the same or different and is selected from substituted or unsubstituted monovalent hydrocarbon groups of 1 to 12 carbon atoms and "a" is from 1.90 to 2.05, the organopolysiloxane being blocked with hydroxyl groups or organoxy groups at both ends of the molecular chain and having a viscosity at 250° C. of at least 24 mPa·s,
   2 to 50 parts by weight of a crosslinking agent which is a silane or siloxane compound having at least two hydrolysable groups in a molecule,
   0.01 to 10 parts by weight of a curing catalyst selected from the group consisting of alkyltin esters, titanates, titanium chelates, organometallic compounds, aminoalkyl group-substituted ammonium salts, alkyl metal salts of lower fatty acids, dialkylhydroxylamines, and silane and siloxane compounds having a guanidyl group, and 0.05 to 0.4% by weight by weight of a metal powder which is sulfidable with sulfur-containing gas, wherein when a precision electronic part is encapsulated or sealed with the cured composition, the metal powder in the cured composition is sulfided with sulfur-containing gas for thereby preventing or retarding the corrosion of the precision electronic part with the sulfur-containing gas in the cured state, whereby the metal powder in the cured composition is sulfided with the sulfur-containing gas for thereby preventing or retarding the corrosion of the electronic part with the sulfur-containing gas.

8. A silver-containing precision electronic part encapsulated with an organopolysiloxane composition comprising 100 parts by weight of an organopolysiloxane represented by the average compositional formula $R^1_a SiO_{(4-a)/2}$ wherein $R^1$ is the same or different and is selected from substituted or unsubstituted monovalent hydrocarbon groups of 1 to 12 carbon atoms and "a" is from 1.90 to 2.05, the organopolysilixane being blocked with hydroxyl groups or organoxy groups at both ends of the molecular chain and having a viscosity at 250° C. of at least 24 mPa·s, 2 to 50 parts by weight of a crosslinking agent which is a silane or siloxane compound having at least two hydrolysable groups in a molecule, 0.01 to 10 parts by weight of a curing catalyst selected from the group consisting of alkyltin esters, titanates, titanium chelates, organometallic compounds, amino alkyl group-substituted ammonium salts, alkyl metal salts of lower fatty acids, dialkylhydroxylamines, and silane and siloxane compounds having a guanidyl group, and 0.05 to 0.4% by weight of a metal powder which is sulfidable with sulfur-containing gas, wherein when a precision electronic part is encapsulated or sealed with the cured composition, the metal powder in the cured composition is sulfided with sulfur-containing gas for thereby preventing or retarding the corrosion of the precision electronic part with the sulfur-containing gas in the cured state, said electronic part being selected from a silver electrode and a silver chip resistor.

* * * * *